No. 734,992. PATENTED JULY 28, 1903.
J. M. STETTER.
TRIMMING MACHINE.
APPLICATION FILED APR. 23, 1903.
NO MODEL. 8 SHEETS—SHEET 2.

Witnesses  Inventor
 John M. Stetter
By Bradford & Hood,
Attorneys

No. 734,992. PATENTED JULY 28, 1903.
J. M. STETTER.
TRIMMING MACHINE.
APPLICATION FILED APR. 23, 1903.
NO MODEL. 8 SHEETS—SHEET 3.

Fig. 4.

Witnesses
Frank A. Fahle
J. A. Walsh

Inventor
John M. Stetter
By Bradford & Hood,
Attorneys

No. 734,992. PATENTED JULY 28, 1903.
J. M. STETTER.
TRIMMING MACHINE.
APPLICATION FILED APR. 23, 1903.
NO MODEL. 8 SHEETS—SHEET 8.

Witnesses
Frank R A Fahle
J. A. Walsh

Inventor
John M. Stetter
By Bradford & Hood,
Attorneys

No. 734,992.

Patented July 28, 1903.

UNITED STATES PATENT OFFICE.

JOHN M. STETTER, OF MUNCIE, INDIANA.

TRIMMING-MACHINE.

SPECIFICATION forming part of Letters Patent No. 734,992, dated July 28, 1903.

Application filed April 23, 1903. Serial No. 154,000. (No model.)

*To all whom it may concern:*

Be it known that I, JOHN M. STETTER, a citizen of the United States, residing at Muncie, in the county of Delaware and State of Indiana, have invented certain new and useful Improvements in Trimming-Machines, of which the following is a specification.

In the manufacture of bolts and such like articles the blanks as made by the heading-dies are commonly left with a fin at the lower edges of the sides of the head. This fin needs to be removed by a subsequent operation. Heretofore it has generally been the practice to remove it by means of a die which cuts downwardly over the head. This has been effective to remove the main fin left by the forging operation, but has itself produced a small downwardly-projecting fin which it has been necessary to remove by still another operation, as by filing or grinding. In dies of the ordinary sort it is not practicable to cut upwardly along the sides of the bolt-head, as there has been no good means of guiding the dies, the squared sides of the bolt-head (which are above the fin) being necessary as die-guides in order to do rapid work. The presses containing these head-trimming dies have also been usually fed by hand, which is both a comparatively slow and a rather dangerous operation, operatives frequently losing their fingers while performing the work.

A leading object of my present invention is to provide a trimming-machine adapted to trim the fins from such bolt-heads and in which the dies shall be operated to cut upwardly past the squared sides of the head, thus wholly eliminating the possibility of leaving any fins from the cut.

A further object of my invention is to provide mechanism in said machine which will receive the bolts from a feeder and feed them in automatically and regularly, thus greatly increasing the speed of the operation and eliminating the danger above described.

I will now proceed to illustrate and describe a machine embodying said invention.

Referring to the accompanying drawings, which are made a part hereof and on which similar reference characters indicate similar parts.

This machine, generally speaking, is in the form of a punch-press, and the mechanism is mounted on an appropriate frame, comprising a suitable bed, as 21, which supports the trimming-dies, and a suitable housing 22, in which is mounted the main shaft 23, upon which are mounted the eccentrics which operate the punching-die and other working parts.

Figure 1:
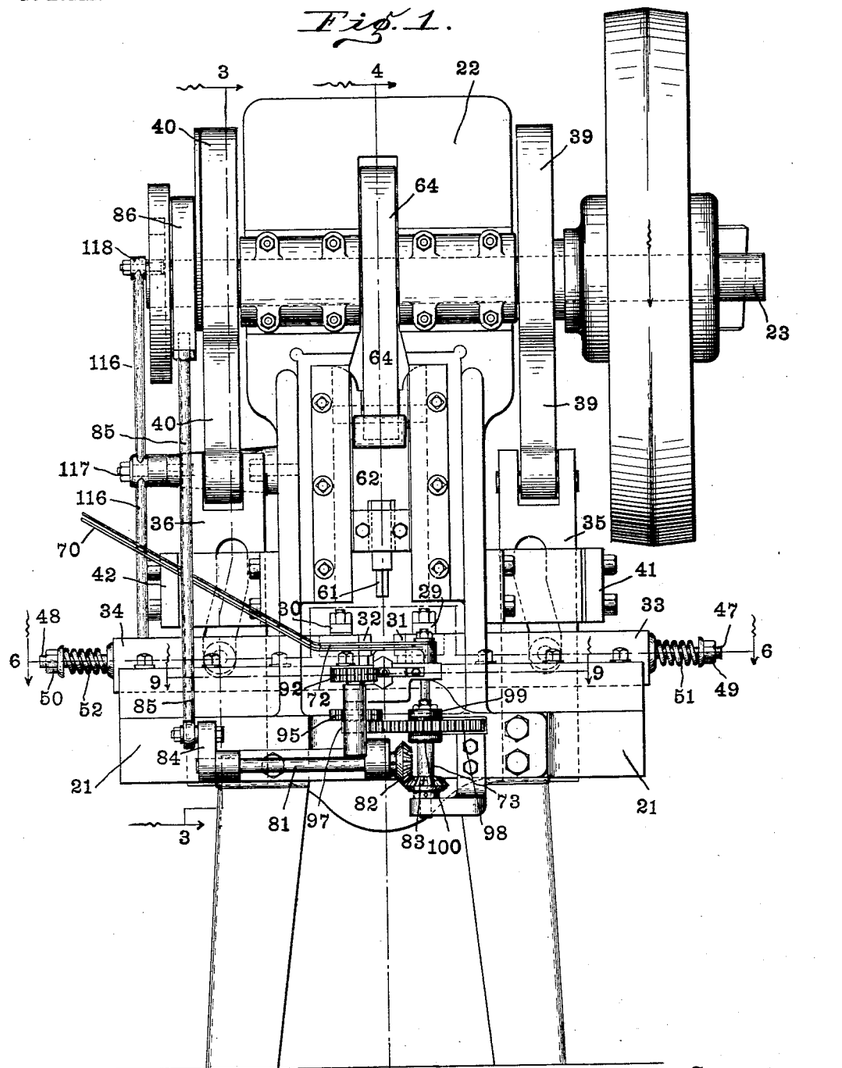
Figure 1 is a front elevation of such a machine.
Figures 2, 3:
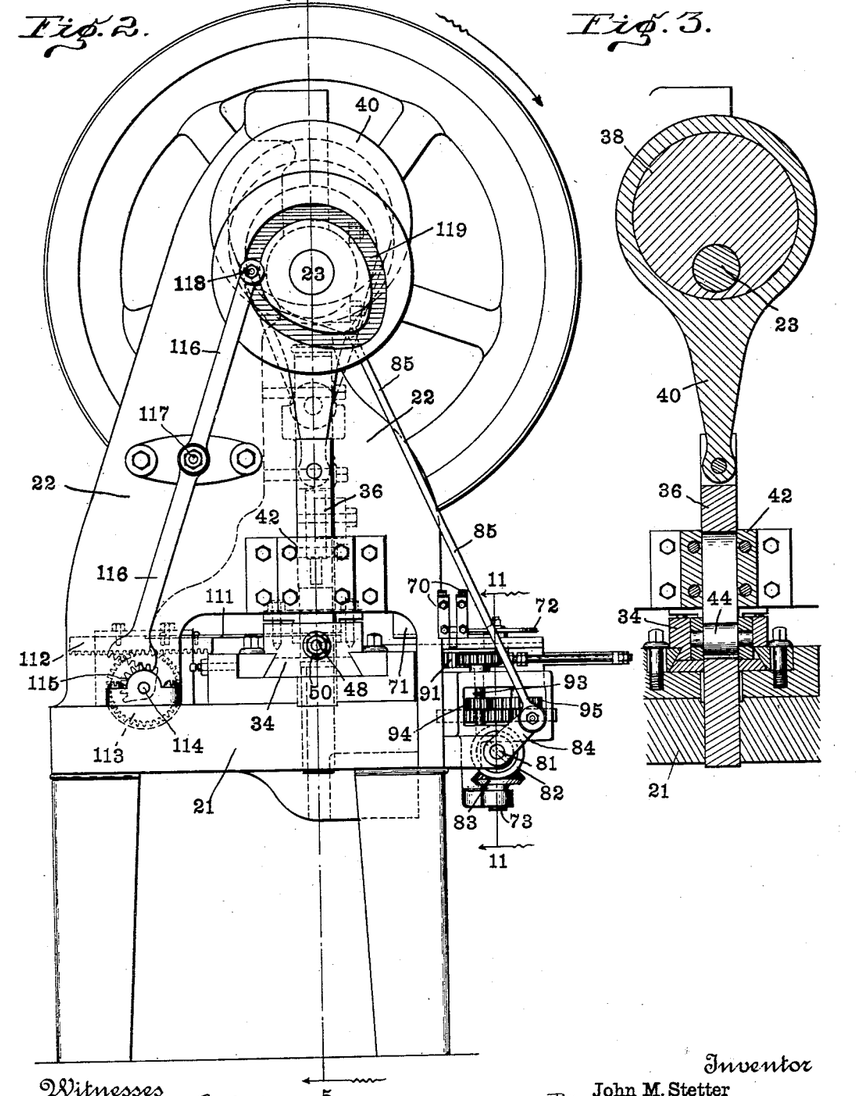
Fig. 2, a side elevation thereof.
Fig. 3, a partial vertical sectional view at the point indicated by the dotted lines 3 3 in Figs. 1 and 5.
Figure 4:
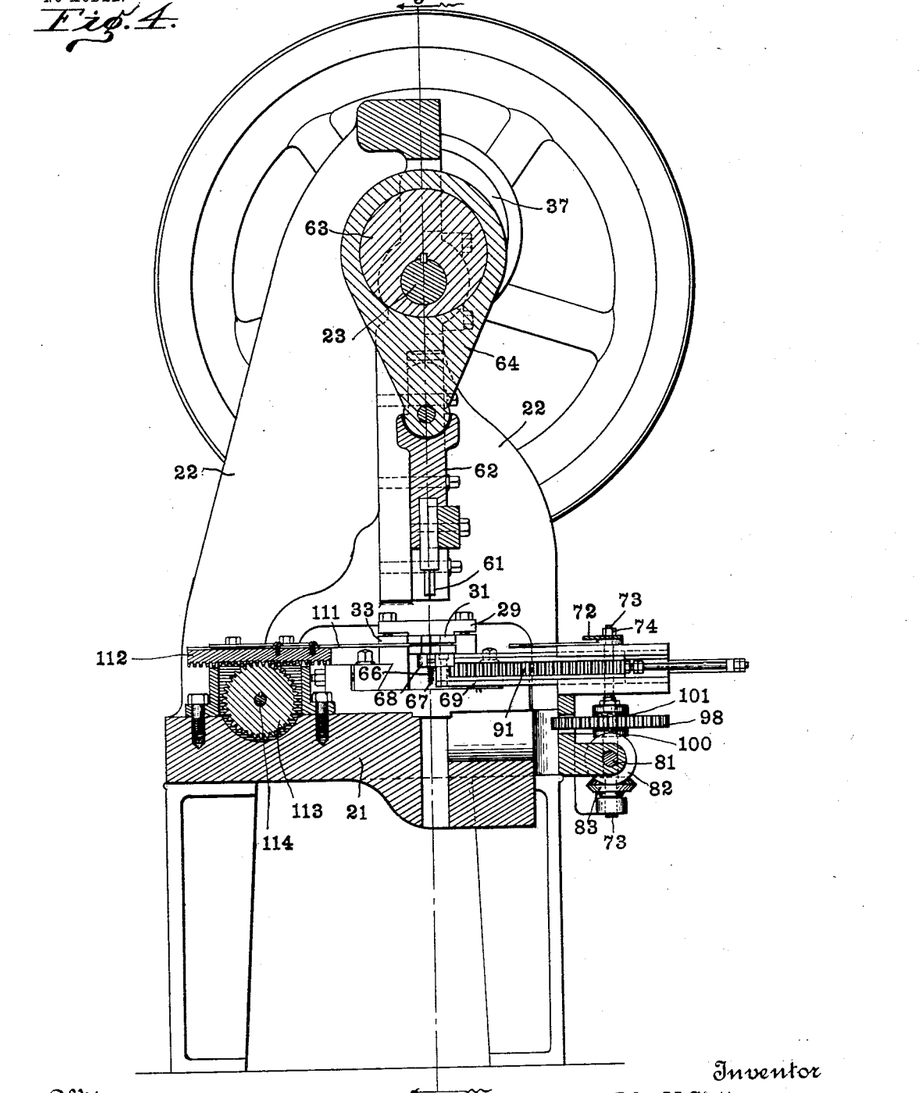
Fig. 4, a complete central vertical sectional view as seen when looking in the direction indicated by the arrows from the dotted lines 4 4 in Figs. 1 and 5.
Figure 5:
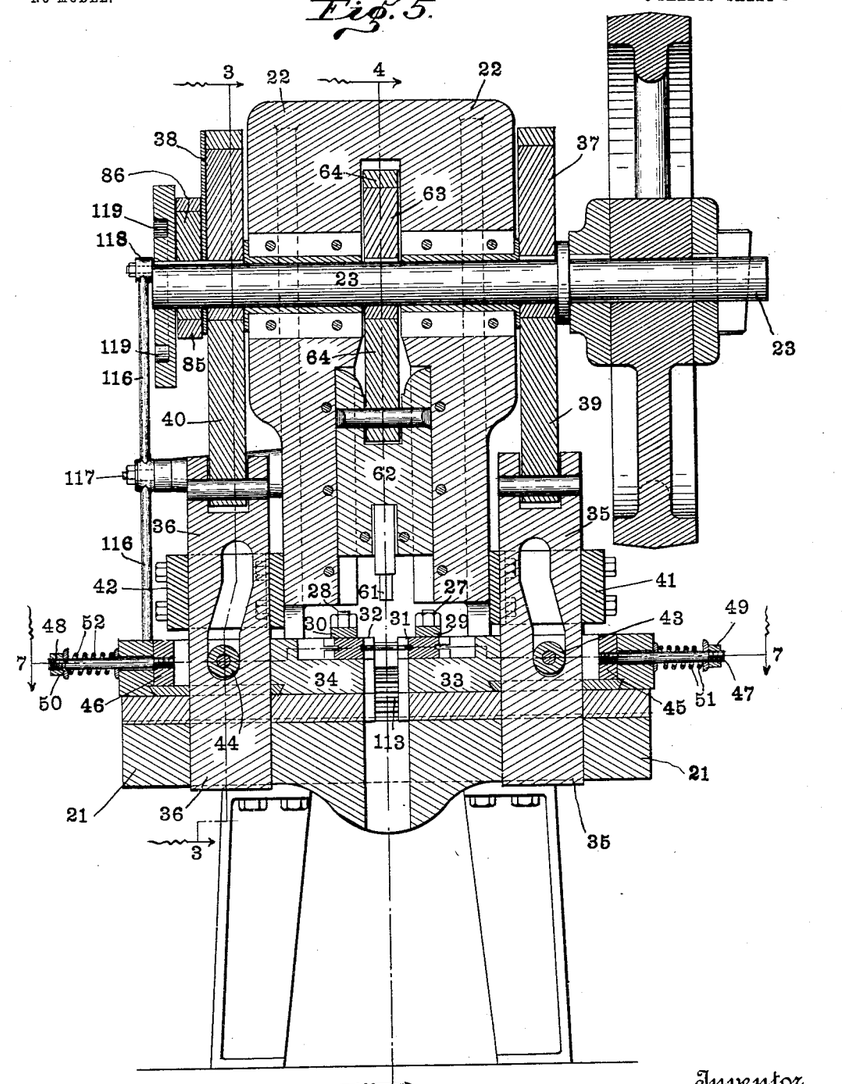
Fig. 5, a central vertical sectional view as seen when looking in the direction indicated by the arrows from the dotted lines 5 5 in Figs. 2 and 4.

The trimming-dies 31 and 32 are two in number and are mounted in appropriate seats in die-supports 33 and 34, which are in turn mounted on the frame-bed 21. Said supports (carrying said dies) are actuated to move toward and from each other synchronously by the cam-plungers 35 and 36 engaging therewith, which are in turn driven from the eccentrics 37 and 38 on the shaft 23 through pitmen 39 and 40. The cam-plungers 35 and 36 are supported strongly against sideway movement by the bearings 41 and 42, provided therefor on the housing 22 and similar bearings into which their lower ends pass in the frame-bed 21, as is best shown in Fig. 5. It is, however, necessary in the event of a bolt getting between the dies improperly, so that they cannot be driven close together into their normal operative position, that their supports shall be sufficiently yielding to avoid breakage or damage to the machine. For this reason I mount the rollers 43 and 44, with which the cam-slots in the plungers 35 and 36 immediately engage, in housings 45 and 46, which in turn are mounted in the die-supports 33 and 34. These housings are normally held back closely against the outer sides of the openings formed to receive them in said supports, and the ordinary operation is substantially the same as though said supports and said housings were formed integrally. Said housings are, however, held to their place by means of bolts 47 and 48, which are secured rigidly to said housings and extend outwardly through suitable perforations in said supports and bear adjusting-nuts 49 and 50 upon their outer ends, between which and the surfaces of the die-supports I interpose stout springs 51 and 52, which while capable of holding said housings to place under the ordinary pressure which the machine exerts will under extraordinary pressure yield and permit the housings to move inwardly somewhat, thus avoiding applying a damaging force to the dies.

The male die 61 is carried by an ordinary reciprocating press-head 62, which is actuated from the cam 63 on the shaft 23 by a suitable pitman 64. The operating-point of this die I prefer to make of about the shape and slightly less than the size of the bolt-heads upon which it operates; but obviously the size and shape are not highly important, except that of course they must be such as to insure sufficient strength for the work and to enable said die to pass down through the opening between the trimming-dies.

The trimming-dies themselves are of a peculiar form. Their adjacent sides contain V-shaped depressions, which when the dies come together embrace and fit against the sides of the head of the bolt being operated upon. The faces of these dies are divided horizontally by slits of sufficient size to receive the fins on the edges of the bolt-heads. These slits may be said to divide these operative surfaces into two dies, or double dies, one part of which operates to guide and hold the bolt-head, while the other operates to cut away the fins, and thus trim said bolt-head. This double function of both guiding and cutting is highly important to the proper execution of the work I have designed to do, and it enables me to trim the fins by a cut which is delivered upwardly past the sides of the bolt-head instead of downwardly, as heretofore, as will be obvious upon examination. As before stated, these trimming-dies are supported in suitable seats in the die-supports 33 and 34 in the construction illustrated. They are firmly held in these seats, after being properly adjusted, by means of the clamping-bars 29 and 30, which in turn are secured by means of strong bolts 27 and 28.

Figures 6, 11, 12:
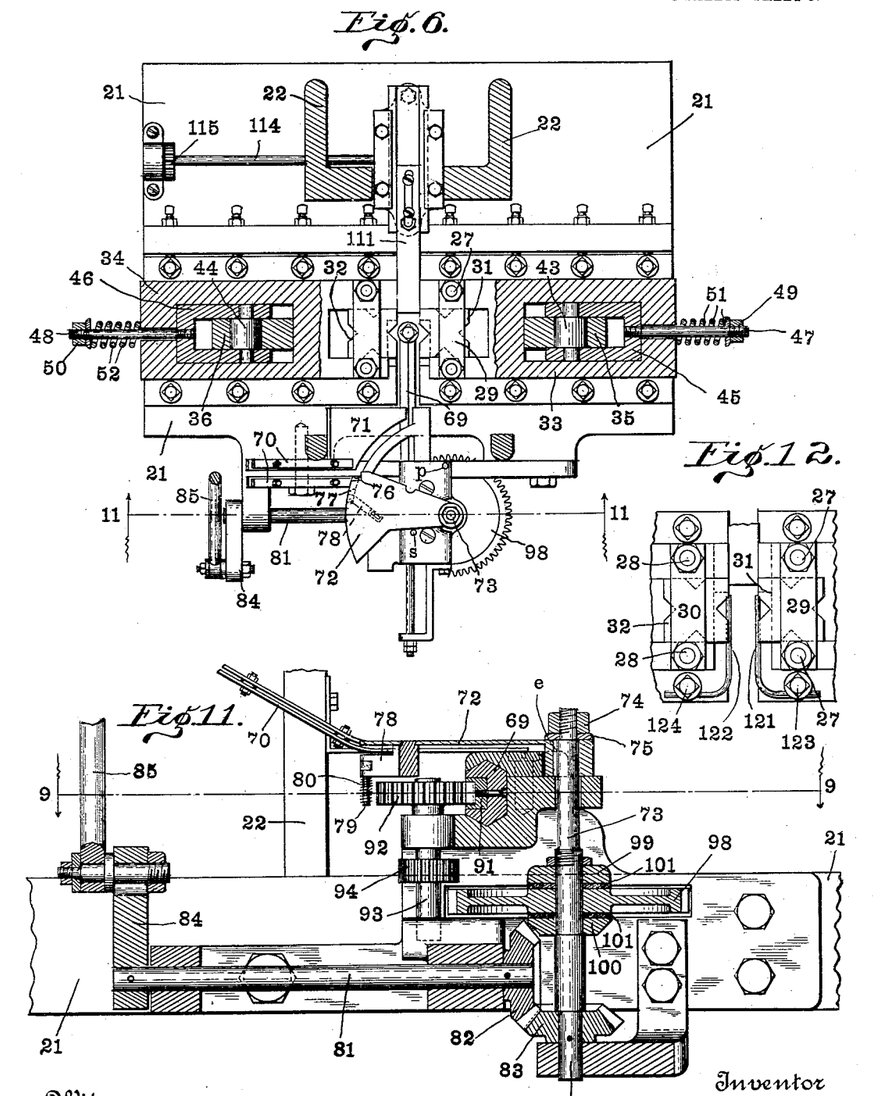
Fig. 6, a horizontal sectional view looking downwardly from the dotted lines 6 6 in Fig. 1.
Fig. 11, a detail sectional view on an enlarged scale when looking in the direction indicated by the arrows from the dotted lines 11 11 in Figs. 6, 7, and 9.
Fig. 12, a fragmentary detail plan view of the dies and immediately-adjacent parts, being similar to the center portion of Fig. 6, but on an enlarged scale, certain strippers in the form of wire fingers being shown therein which are omitted in Fig. 6 on account of the smallness of the scale.
Figures 7, 15:
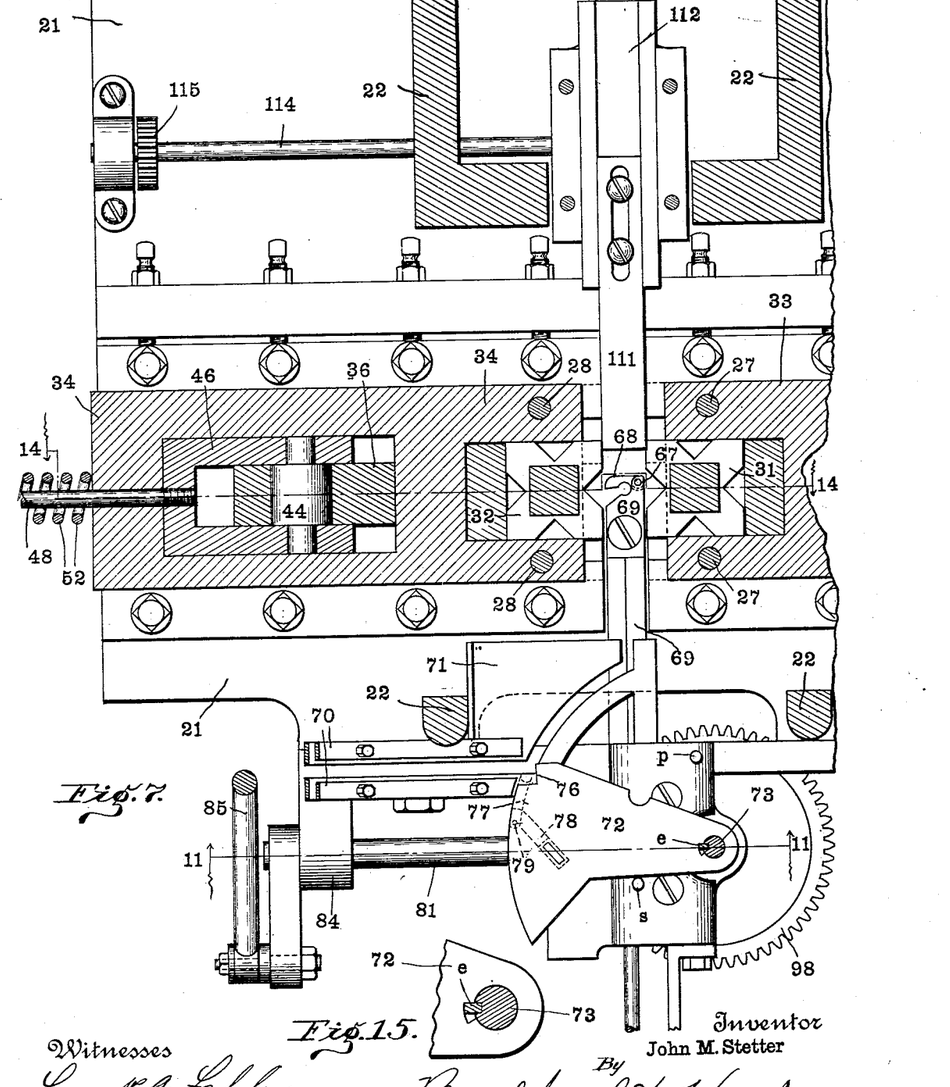
Fig. 7, a detail horizontal sectional view as seen when looking in the direction indicated by the arrows from the dotted line 7 7 in Fig. 5.
Fig. 15, a fragmentary detail similar to a portion of Fig. 7, but on a still further enlarged scale.

The bolts or bolt-blanks are received by this machine from any suitable source of supply, a fragment of a delivering-guideway 70 leading from such source of supply (not shown) being indicated in Figs. 1, 6, 7, 8, and 11 as the device from which this machine is immediately fed. As these bolts or bolt-blanks emerge from this guideway they are received into a slot or curved way in a table 71 of the machine and are thence forced around by a vibrating carrier 72 to a point in line with the center of the machine and are thence taken and carried to said central point between the trimming-dies by mechanism which will be presently described. The dies are then operated toward each other, closely approaching the head of the bolt, and the trimming operation is performed as has already been indicated. After the bolt drops through a "chip-sweep" removes the trimming. The carrier 72 is mounted upon a vertical shaft 73, which is operated from the rock-shaft 81 through bevel-pinions 82 and 83, said rock-shaft being in turn operated through its crank-arm 84 by a pitman 85, which is driven by the eccentric 86 on the shaft 23. Said shaft 73 is thus given a regular rocking movement, and the carrier 72 is caused to regularly move through the arc of a circle and is arranged to carry the bolts coming from the guideway 70 around to the point whence they are taken by a second carrier and delivered to the dies. The slot or curved way in the table 71 is curved to conform to this arc of travel, as is clearly shown in Figs. 6 and 7. The vibrating carrier 72, as before stated, is mounted on the upright shaft 73. The attachment is frictional in character, said carrier being, as best shown in Fig. 11, held onto said shaft by means of a jam-nut 74 and a washer 75, the latter of which may be of a compressible character, thus better enabling the operative to adjust the desired amount of friction accurately. This method of attachment prevents breakage or damage to the parts in case a bolt should become jammed in the slot or curved way in the table 71. Stop-pins $s$ and $p$ are, however, provided to limit the movement of said carrier when it is thrown out of its regular stroke by jamming or clogging and to restore it to its proper position ready for use upon the next movement of the machine after any such jamming or clogging occurs.

The bolts are delivered to a notch forming the working face of the carrier 72, and said notch is additionally armed with a face-plate 76, carried by a finger 77, mounted in a bearing 78, provided therefor and which is rigidly secured to the body of the carrier 72. The face-plate 76 insures that the bolt shall be held in upright position and carried in that position to the point where it is to be delivered to the other carrier, so that it may enter the gripping-jaws of said other carrier properly. The pivot 79, on which the finger 77 is mounted, extends down sufficiently to carry a coiled spring 80, and the parts are so connected together as that the finger is held yieldingly by said spring, which enables the bolt to be guided unerringly to the proper point even when the parts are somewhat loose or worn. To insure certainty of operation, it is desirable that the carrier 72 shall pause for a moment at the end of its stroke where it delivers the bolts to the carrier 69 in order that said carrier 69 may begin its movement before the return movement of the carrier 72 begins. To enable it to do this, I set a spline $e$ in the shaft 73 at the point where said carrier 72 is mounted thereon and make the keyway in said carrier, which fits over said spline, of somewhat larger size, thus providing for the necessary looseness and permitting the momentary pause in question.

Figures 8, 9, 10:
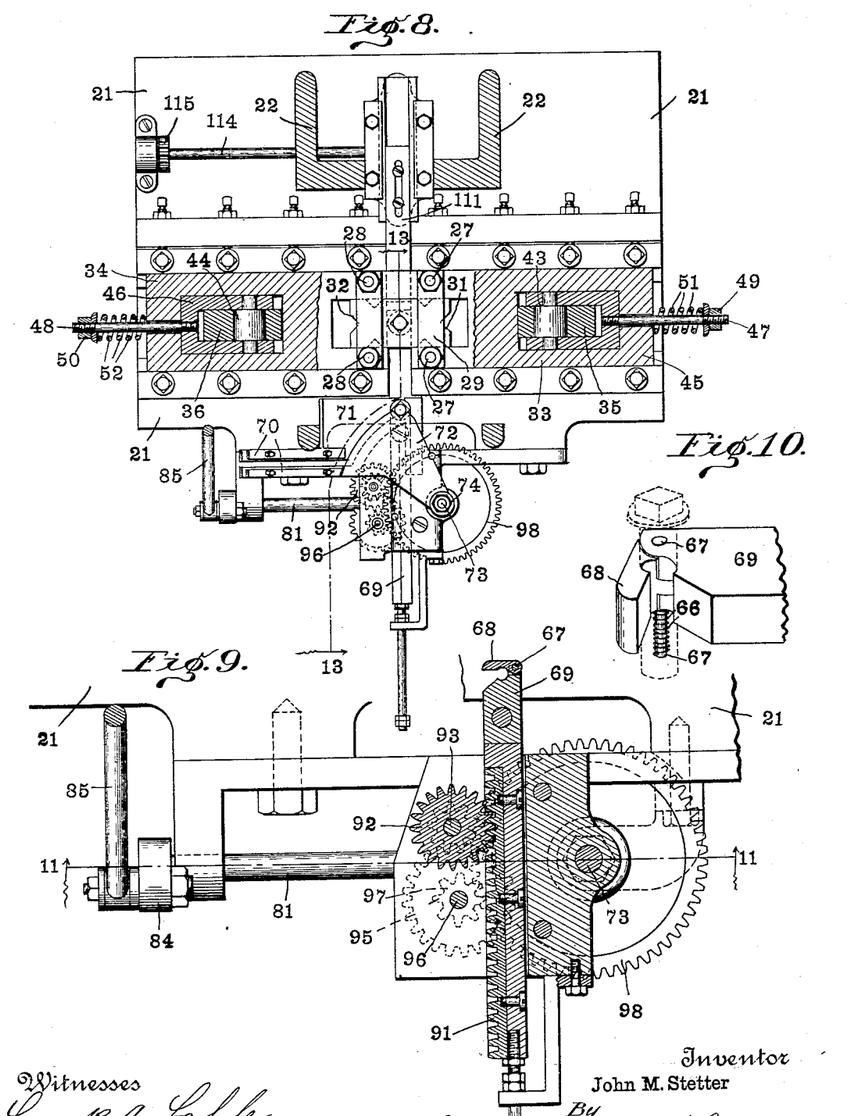
Fig. 8, a view similar to Fig. 6, except that the parts are at their extreme operated position, as when the machine is grasping a bolt at the instant of the head-trimming operation.
Fig. 9, a detail horizontal sectional view on a considerably-enlarged scale as seen when looking downwardly from the dotted line 9 9 in Figs. 1 and 11.
Fig. 10, a detail fragmentary perspective view of the bolt receiving and carrying jaws, the position of a bolt therein being indicated by means of dotted lines.
Figure 13:
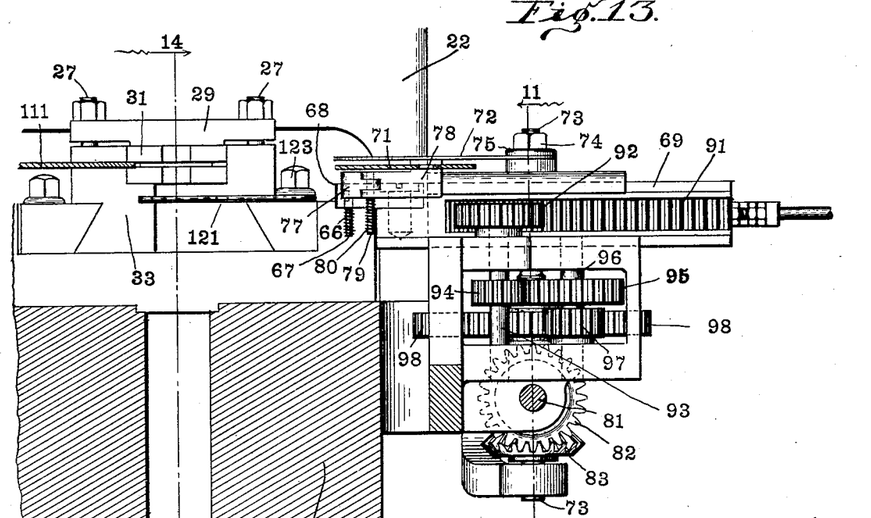
Fig. 13, a detail sectional view as seen when looking in the direction indicated by the arrows from the dotted lines 13 13 in Fig. 8, showing the feed-mechanism gearing in side elevation.
Figure 14:
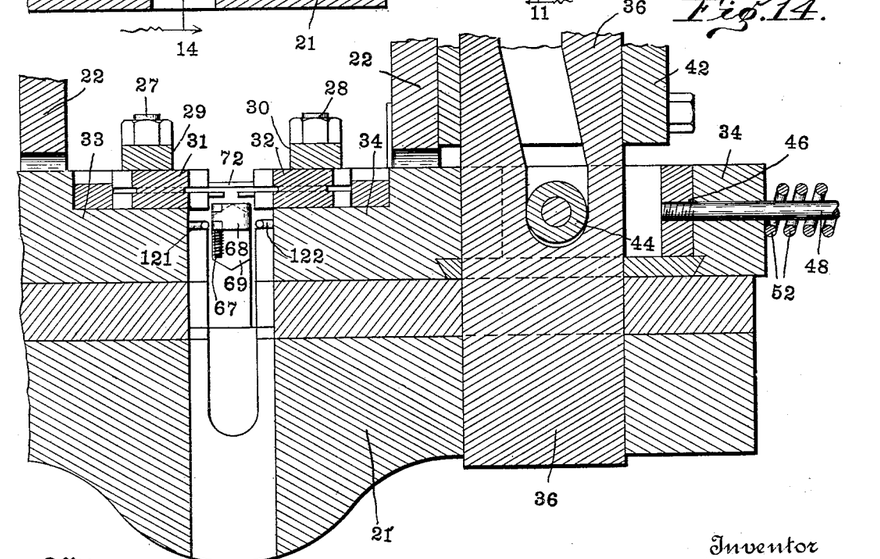
Fig. 14, a detail sectional view as seen when looking in the direction indicated by the arrows from the dotted lines 14 14 in Fig. 13.

The bolts are received from the swinging carrier 72 by a reciprocating carrier 69, the form of which is best shown in Figs. 11 and 13 and which is provided with a gripping and holding finger 68, united to the body of the carrier by a pivot 67, upon the lower end of which (see especially Figs. 13 and 14) is a coiled spring 66. This spring is of sufficient strength to actuate the finger 68 to hold the bolt firmly until it is carried between and gripped by the trimming-dies 31 and 32. It will then yield as the carrier is withdrawn and allow the finger to swing sufficiently to escape the bolt. As best shown in Figs. 9 and 13, this reciprocating carrier 69 is provided with a rack-bar 91, which engages with a spur-pinion 92 on a counter-shaft 93, and said shaft 93 carries another pinion 94, which engages with still another pinion 95 on the shaft 96, and shaft 96 bears still another pinion 97, which engages with the spur gear-wheel 98, which is mounted upon the shaft 73. Thus both these carriers are thus driven from the same shaft and the same source of power, and therefore their relative movements are always the same. For like reasons as in the case of the other carrier a yielding should be provided for in the mounting of this carrier in case any of the bolts should become stuck or jammed. I have, therefore, as best shown in Fig. 11, secured the spur gear-wheel 98 to the shaft 73 between a nut 99 and a collar 100 and have interposed between the hub of said wheel and said nut and collar compressible washers 101, thus providing frictional engagement which may be regulated so as to drive the machine unerringly under ordinary circumstances, but which will yield somewhat in case of accident, and thus avoid breaking or damaging the machine.

As heretofore indicated and shown in the drawings, the bolts are delivered to the dies by a carrier which passes beneath said dies, the point of engagement being on the bolt shanks or stems sufficiently below their heads to permit this to be done. In doing its work the punching-die drives the bolt downwardly between the trimming-dies a sufficient distance to perform the trimming operation, but, preferably, not far enough to carry the bolt-heads clear of the trimming-dies. Consequently the bolts are held by said trimming-dies until said dies separate, when they ordinarily drop out. Sometimes, however, the bolt, instead of dropping out from between the trimming-dies as the latter separate, will adhere to one or the other of them and be carried away with it. If this adhesion was permitted to continue until another bolt was brought in between the dies by the carrier, breakage of the machine would result. In order to guard against this, I have provided the strippers 121 and 122, which are secured to an adjacent stationary part of the machine by bolts 123 and 124. These strippers are also located below the trimming-dies and should be in the same plane as the carrier by which the bolts are delivered to the dies, said carrier passing between said strippers as it reciprocates in and out. As the trimming-dies separate, if a bolt adheres to either one or the other of them the corresponding stripper will throw it out, thus insuring that the dies shall be left free for the incoming bolt. These strippers also insure that the bolts shall be thrown out immediately the dies begin to open, in time so as not to be in the way of the chip-sweep.

The trimmings from the bolt-heads have a tendency to stick in the slots of the dies after the trimming operation has been performed. These trimmings must be cleared out succeeding each trimming operation before the next one is performed. For this purpose I have provided a chip-sweep 111, which is driven by a rack-bar 112, and this in turn by spur-pinion 113, mounted on a shaft 114. This shaft 114 bears a second spur-pinion 115 and a vibrating lever 116, the end of which is formed into a segmental rack and engages with this pinion 115, and thus drives said shaft 114. The lever 116 is mounted on a pivot 117 on the main frame or housing 22. At its upper end this vibrating lever is provided with a stud 118, which engages in a cam-groove provided for the purpose in the cam-wheel 119 on the main shaft 23.

All the operating parts being thus driven from cams on a single main shaft, they all operate in a certain predetermined relation to each other, and perform the operations described in rapid succession and with need of but little attention.

Having thus fully described my said invention, what I claim as new, and desire to secure by Letters Patent, is—

1. The combination, in a trimming-machine, of a pair of trimming-dies, means for moving said dies toward each other to a position closely adjacent to the article being trimmed during the trimming operation, means for moving said dies from each other to permit the admission of the article to be trimmed, a punching-die arranged to pass down between said trimming-dies, and means for actuating said punching-die at the time said trimming-dies are near each other.

2. The combination, in a trimming-machine, of a pair of trimming-dies and a punching-die arranged to coöperate with each other, means for moving said trimming-dies toward each other to closely embrace the article to be trimmed, means for moving said trimming-dies apart to admit another article to be trimmed, means for operating the punching-die when the trimming-dies are together, a carrier for carrying the articles to be trimmed into said dies, and means for operating said carrier synchronously with the operation of said dies.

3. The combination, in a trimming-machine, of a pair of trimming-dies having corresponding double faces separated by grooves, means for automatically delivering the articles to be trimmed to said dies in such relation that the fins on such articles will enter said grooves, means for actuating said dies to approach each other and surround the article when it is delivered therebetween, a punching-die arranged to pass between said trimming-dies and force the article therein transversely thereof, thus trimming the fins from said article, and means for actuating said punching-die.

4. The combination, in a trimming-machine, of a pair of trimming-dies, means for moving said dies toward each other to a position closely adjacent to the article being trimmed during the trimming operation, means for moving said dies from each other to permit the admission of the article to be trimmed, a punching-die, means for actuating said punching-die to pass between said trimming-dies, a carrier for delivering the articles to be trimmed to position between said trimming-dies, means for actuating said carrier, a chip-sweep for removing the trimmings from the trimming-dies, and means for actuating said chip-sweep.

5. The combination, in a trimming-machine, of the trimming-dies, the punching-die, means for actuating the same, carriers for automatically delivering the articles to be trimmed to said dies, means for actuating the same, and frictional connections between said carrier and said operating means, whereby in case of jamming or clogging said article-delivering carriers may yield and avoid breakage.

6. The combination, in a trimming-machine, of the trimming-dies, the punching-die, means for actuating the same, article-delivering ways positioned adjacent to said machine, a pivoted carrier for receiving the articles from said ways and carrying the same to in front of the dies, and a reciprocating carrier for receiving the article therefrom and delivering the same to between the dies, in position to be trimmed.

7. The combination, in a trimming-machine, of the trimming-dies, the punching-die, means for actuating the same, article-delivering ways positioned adjacent to said machine, a pivoted carrier for receiving the articles from said ways and carrying the same to in front of the dies, a reciprocating carrier for receiving the article therefrom and delivering the same to between the dies in position to be trimmed, both said last-named carriers being fractionally mounted whereby yielding is permitted in case of jamming or clogging.

8. The combination, in a trimming-machine, of the trimming-dies, means for actuating the same, means for delivering the articles to be trimmed, and a chip-sweep for removing the trimmings from the dies, said chip-sweep consisting of a rack-bar, a shaft, pinions thereon, a pivoted lever having a segmental rack engaging with one of said pinions, and a cam on a shaft of the machine engaging with the other end of said lever.

9. The combination, in a trimming-machine, of the trimming-dies, the punching-die, means for actuating the same, carriers for delivering the articles to be trimmed to the die, a rock-shaft, a train of gearing connecting the article-carriers to said rock-shaft, a crank-arm on said rock-shaft, a cam on the shaft of the machine, and a connecting-rod connecting said cam and said crank-arm.

10. The combination, in a trimming-machine, of the trimming-dies, trimming-die supports, the punching-die, means for operating said punching-die, and means for operating said trimming-dies toward and from each other consisting of vertically-movable plungers having cam-slots engaging with the trimming-die supports, whereby said trimming-dies are caused to closely embrace the article being trimmed during the trimming operation, and are caused to separate for the admission of another article at the conclusion of such trimming operation.

11. The combination, in a trimming-machine, of the trimming-dies, trimming-die supports, cams for operating said trimming-die supports, and housings in said trimming-die supports with which the cams immediately engage, said housings being yieldingly mounted therein, whereby in case of excess of pressure the supports may yield and damage to the machine be thus avoided.

12. The combination, in a trimming-machine, of the trimming-dies, reciprocating die-supports carrying said trimming-dies, reciprocating plungers containing cam-slots for operating said supports, engaging points for said slots, housings carrying said engaging points, and a yielding connection between said housings and the die-supports, whereby excess of pressure will cause said housings to yield whereby the travel of the die is reduced.

13. The combination, in a trimming-machine, of trimming-dies, a punching-die, means for actuating said dies, a carrier for delivering the bolts to the dies, and a second carrier for delivering the bolts to said first-named carrier, said last-named carrier being mounted on a shaft having a spline and provided with a keyway larger than said spline whereby a short pause at the end of the stroke of said carrier is permitted.

14. The combination, in a trimming-machine, of the dies, means for actuating the same, a carrier frictionally mounted on a shaft whereby it may yield in case of clogging or jamming, and stops arranged alongside said carrier for limiting its movement and restoring it to its regular position when accidentally displaced therefrom.

15. The combination, in a trimming-machine, of the trimming-dies, means for moving said trimming-dies toward and from each other, the punching-die, means for actuating the same, and strippers arranged near said trimming-dies, whereby the articles to be trimmed will be thrown out of said dies as they separate in case they adhere thereto.

In witness whereof I have hereunto set my hand and seal, at Indianapolis, Indiana, this 15th day of April, A. D. 1903.

JOHN M. STETTER. [L. S.]

Witnesses:
CHESTER BRADFORD,
JAMES A. WALSH.